Nov. 28, 1950 C. F. BERRY 2,531,904
ENGINE VALVE MECHANISM – TRANSMISSION ACTUATED
RETARDING AND ACCELERATING LINKAGE
Filed Aug. 1, 1947 9 Sheets-Sheet 1
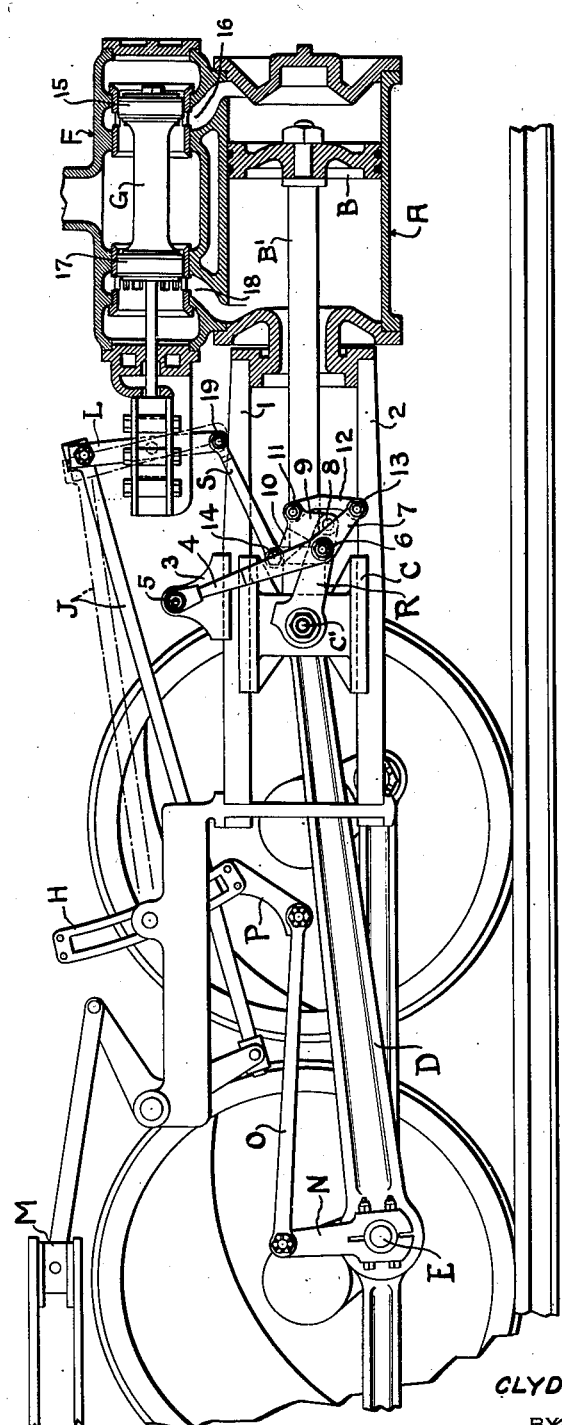
Fig. 1
INVENTOR
CLYDE F. BERRY
ATTORNEY

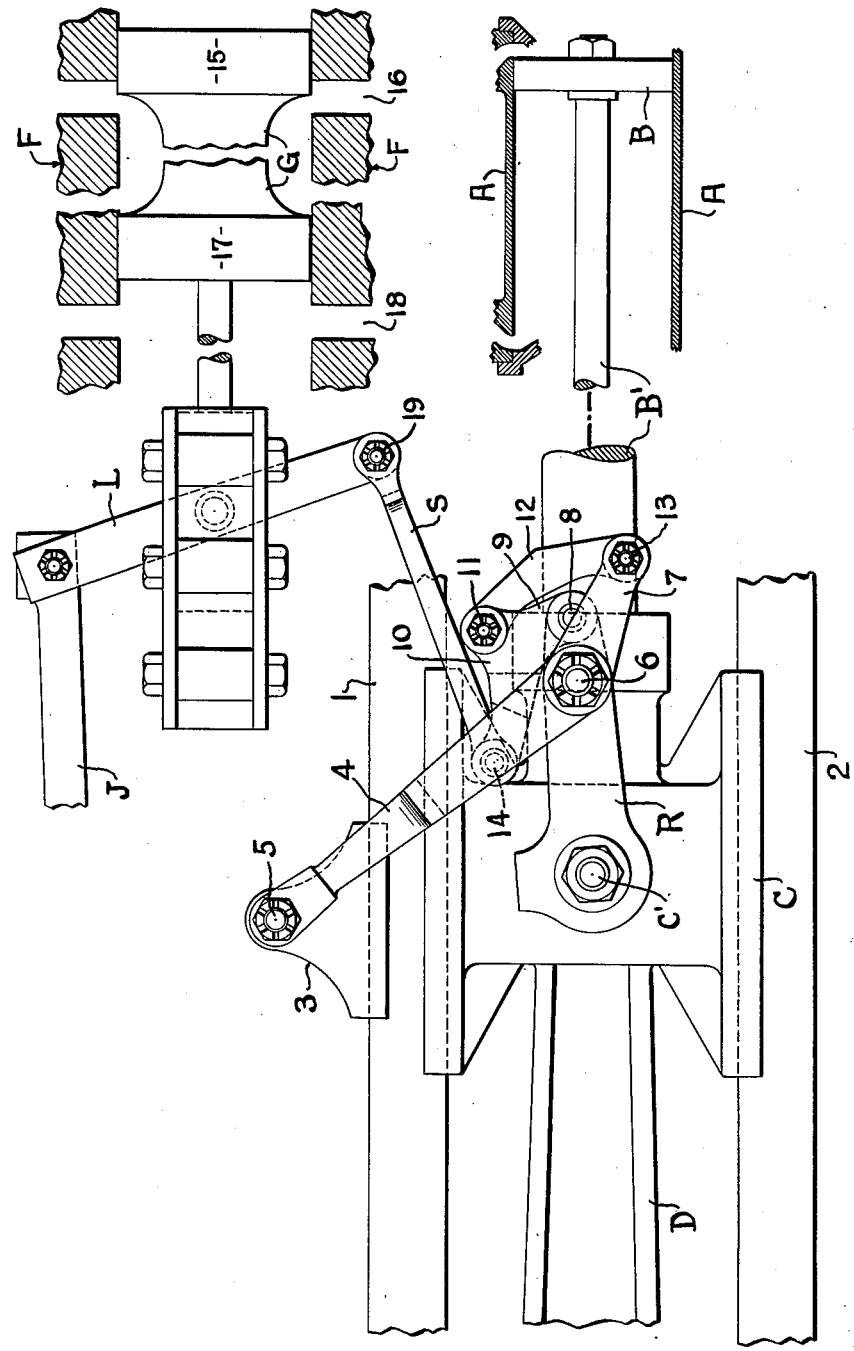

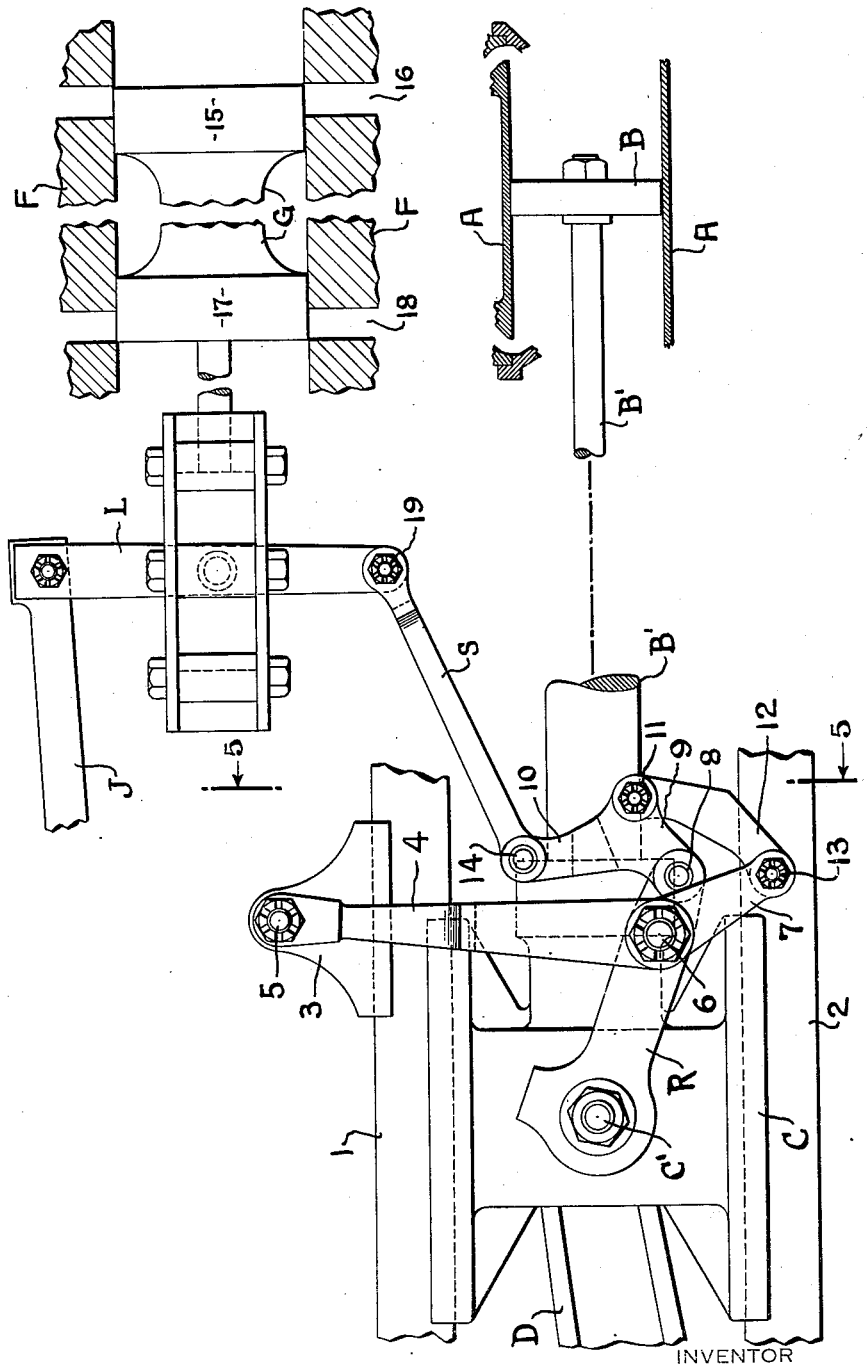

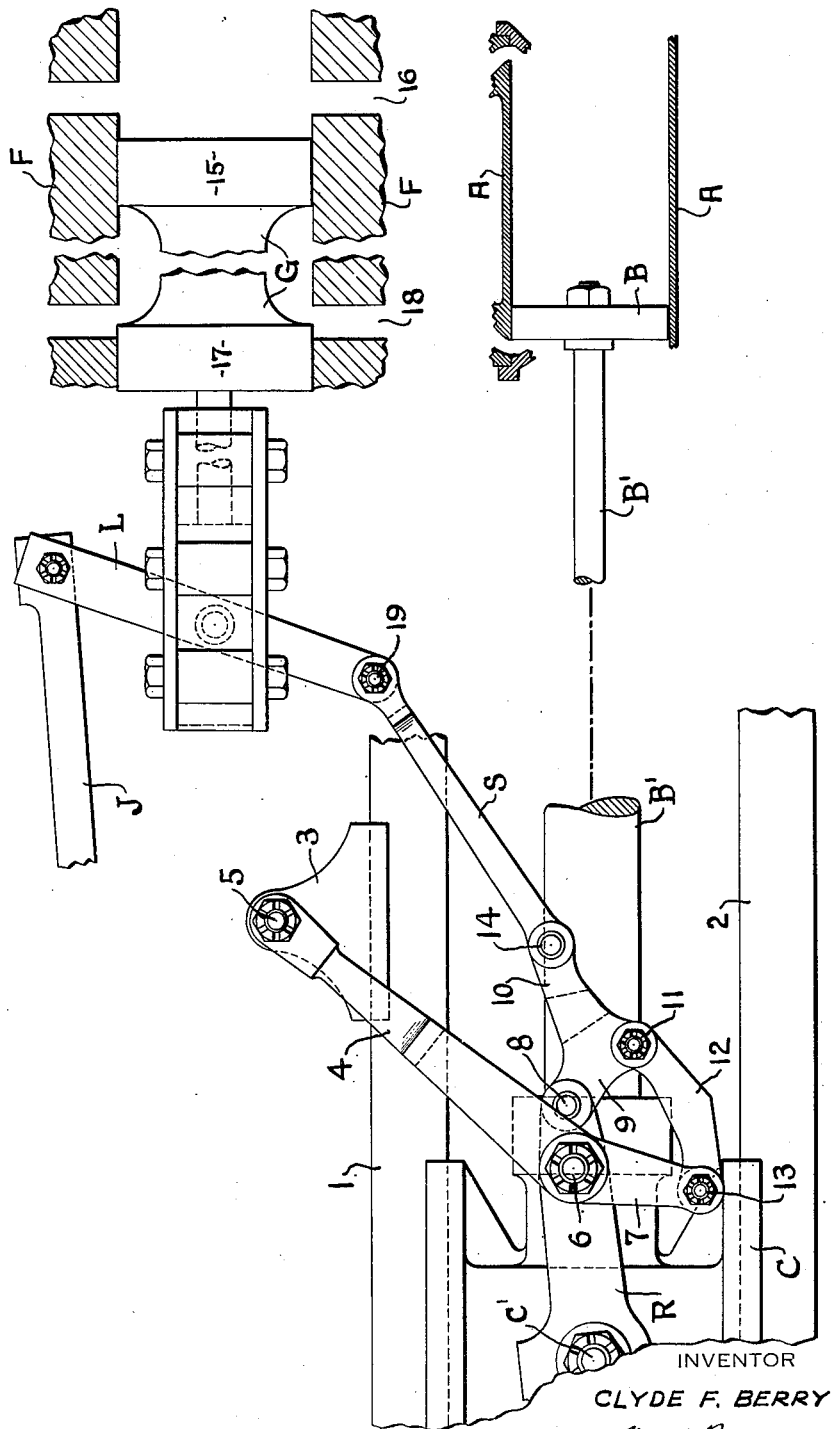

Nov. 28, 1950 C. F. BERRY 2,531,904
ENGINE VALVE MECHANISM — TRANSMISSION ACTUATED
RETARDING AND ACCELERATING LINKAGE
Filed Aug. 1, 1947 9 Sheets-Sheet 5
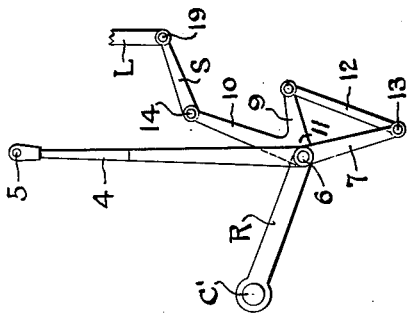
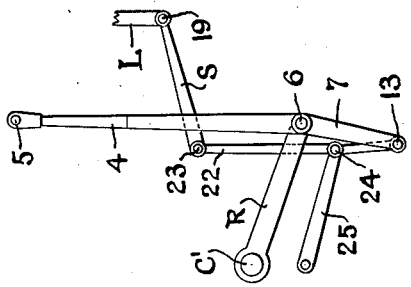
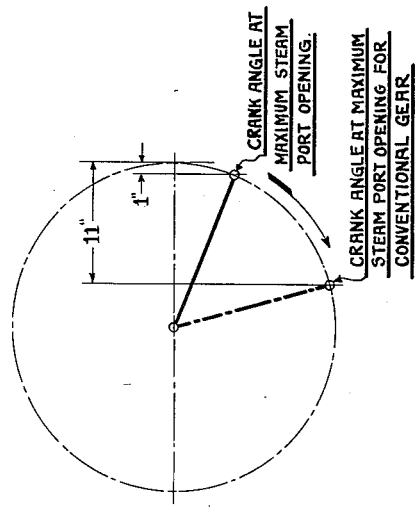
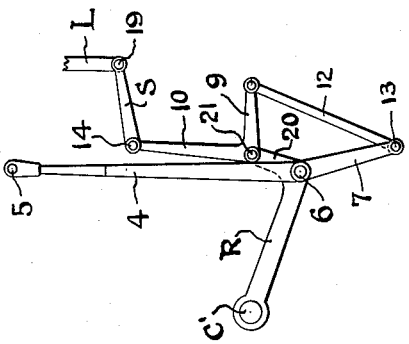
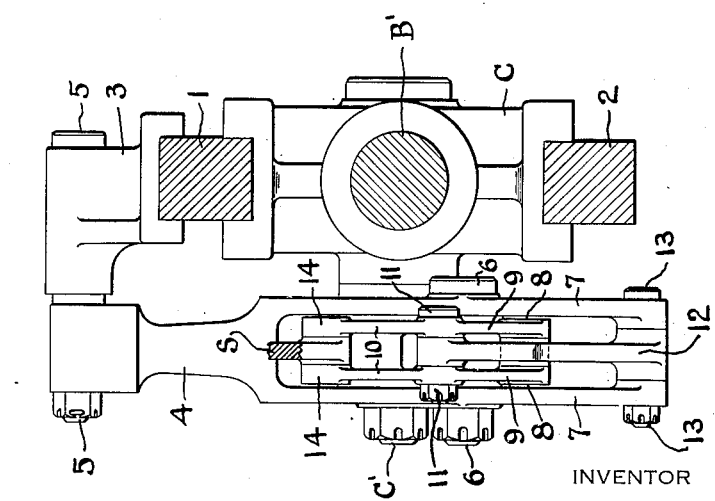
INVENTOR
CLYDE F. BERRY
BY 
ATTORNEY

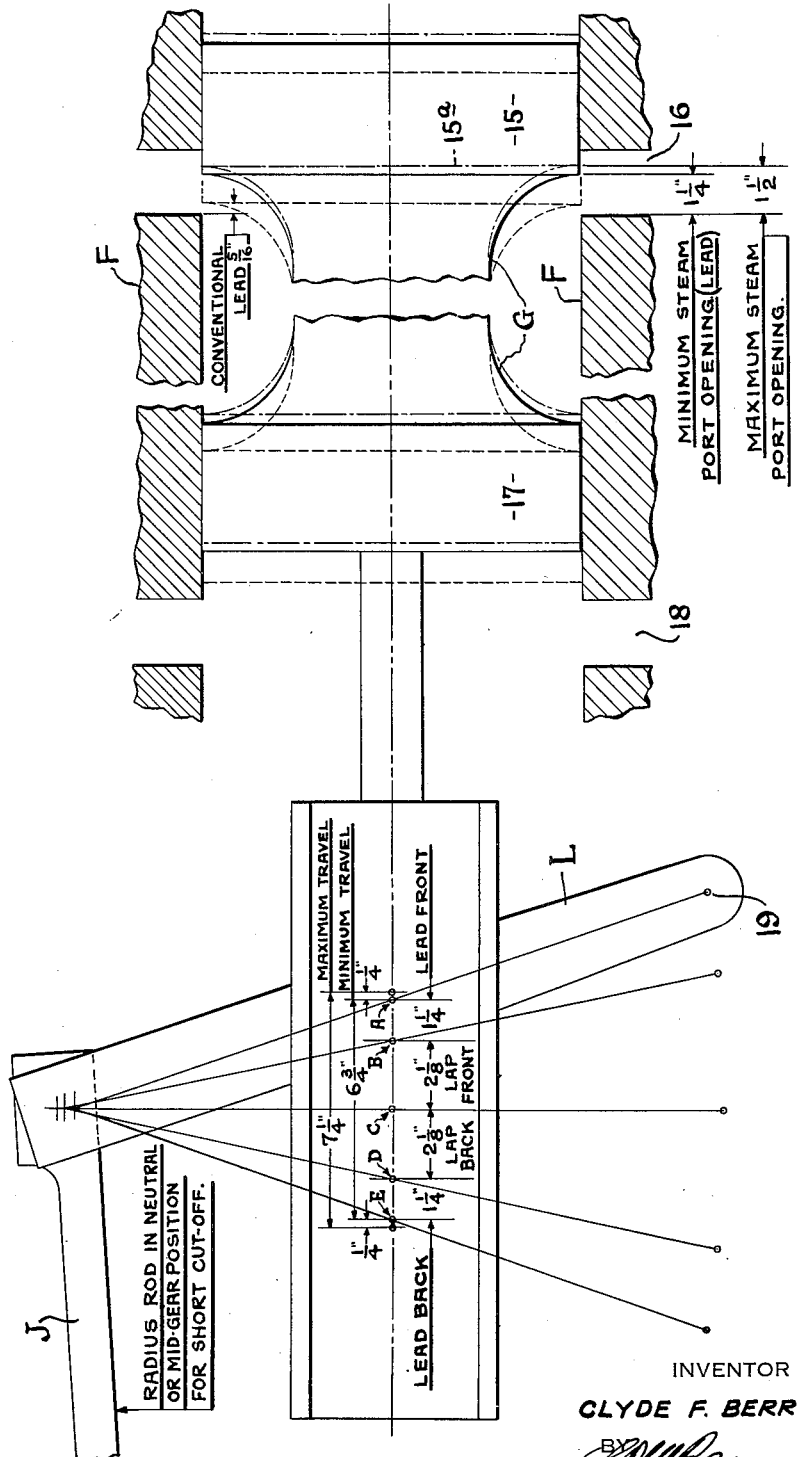

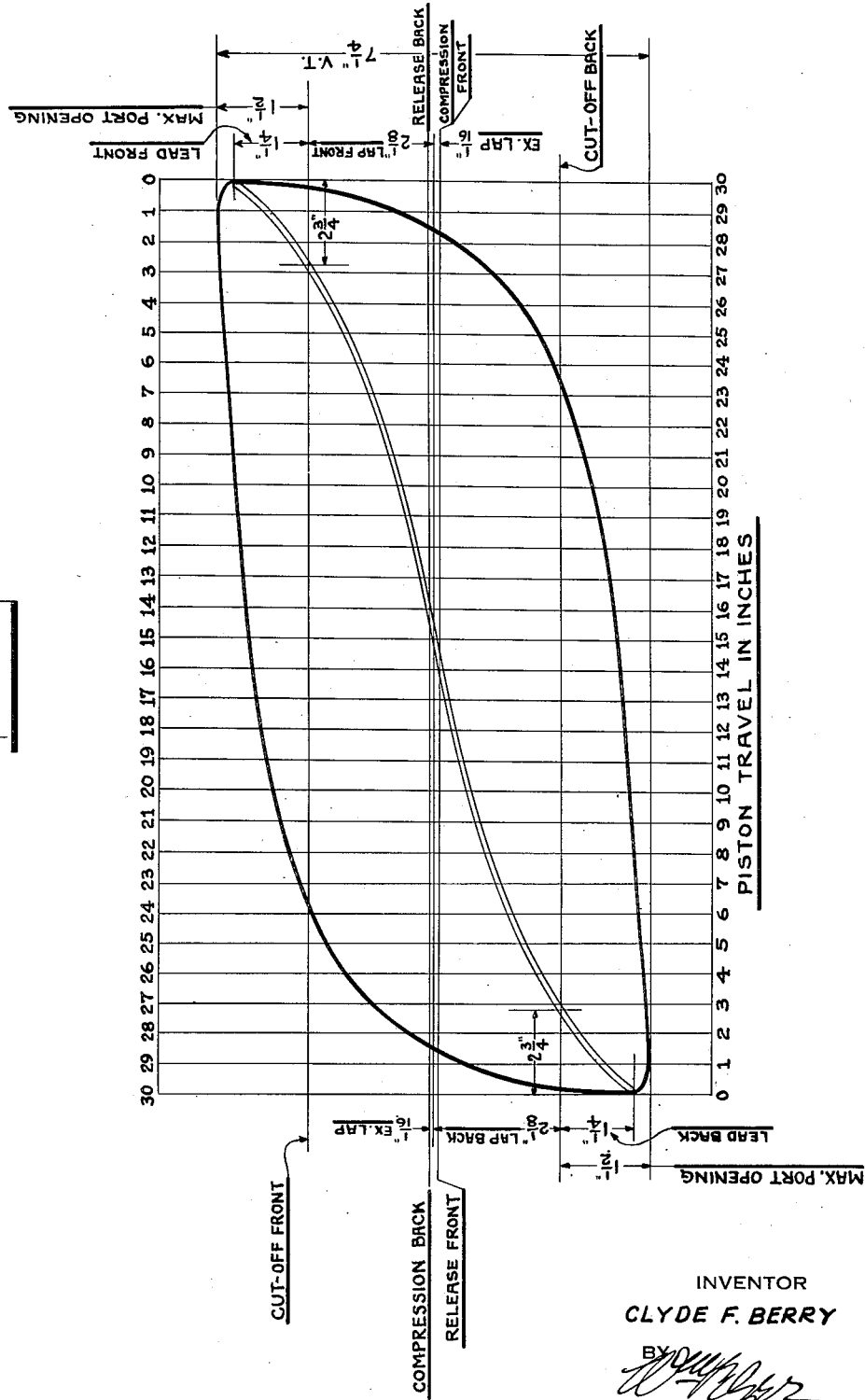

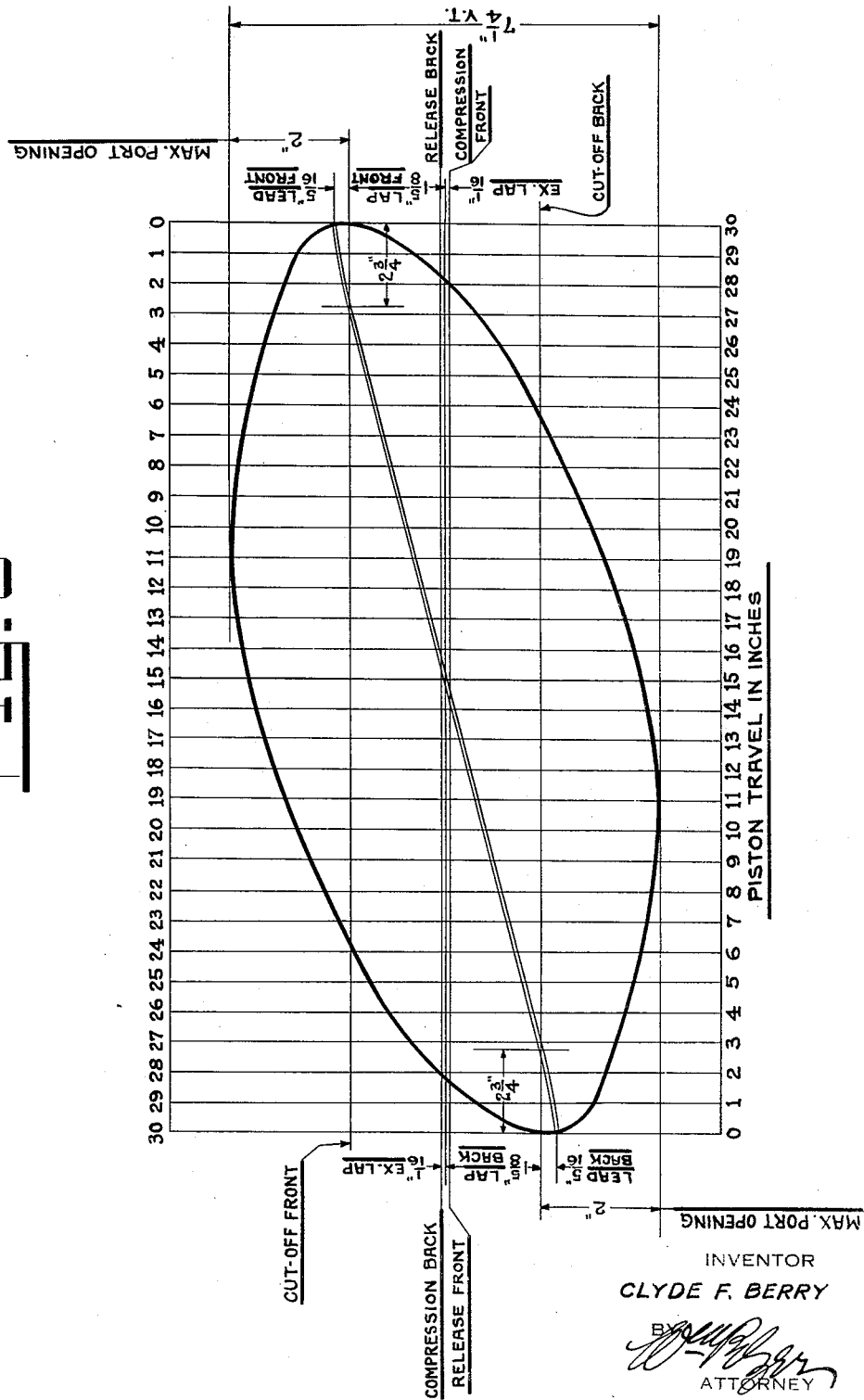

Nov. 28, 1950     C. F. BERRY     2,531,904
ENGINE VALVE MECHANISM – TRANSMISSION ACTUATED
RETARDING AND ACCELERATING LINKAGE
Filed Aug. 1, 1947     9 Sheets-Sheet 9
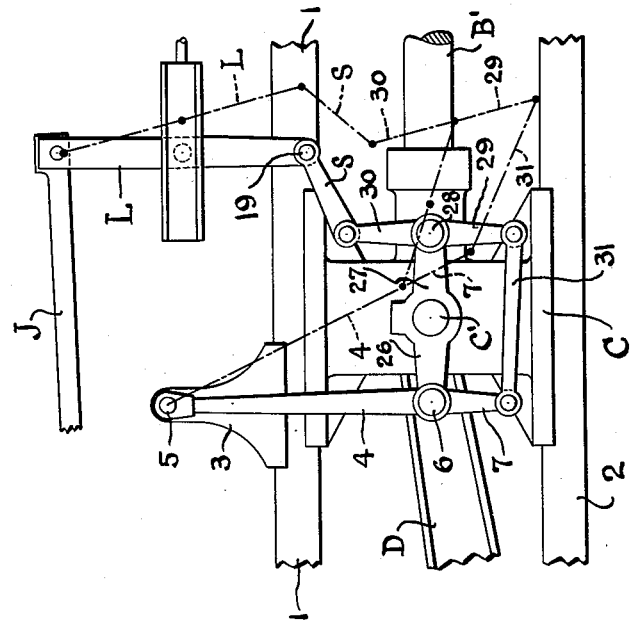
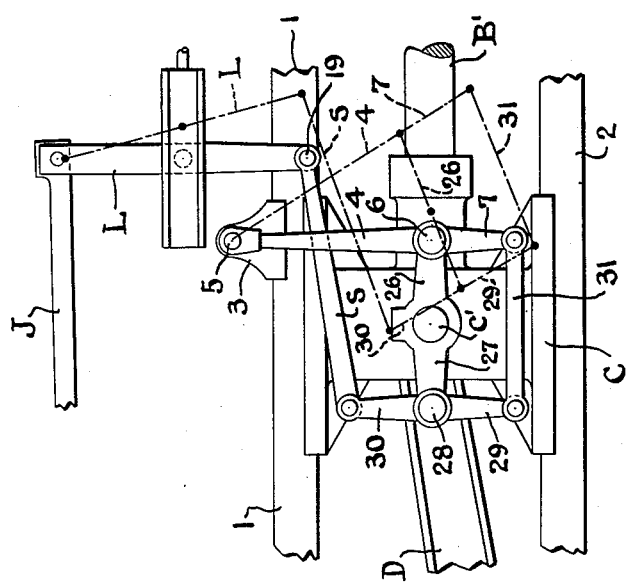
INVENTOR
CLYDE F. BERRY
ATTORNEY Patented Nov. 28, 1950

2,531,904

UNITED STATES PATENT OFFICE 2,531,904

ENGINE VALVE MECHANISM-TRANSMISSION ACTUATED RETARDING AND ACCELERATING LINKAGE

Clyde F. Berry, Manchester, N. H.

Application August 1, 1947, Serial No. 765,606

11 Claims. (Cl. 121—163)

This invention relates to the mechanism for actuating and controlling the movements and timing of steam engine slide valves, particularly locomotive engine slide valves, and more particularly to valve mechanism the movements of which are derived from the main driving crosshead, or from both the main crosshead and the main driving crank pin through the usual link mechanism coupled to a combining lever for actuating the slide valve.

One object of the invention is to provide an auxiliary lever and link system for co-operation with a conventional valve gear to effect a modification of the movements imparted to the valve by the movements of the piston crosshead, or by the combined movements of the crosshead and eccentric rod whereby the valve will be caused to automatically, constantly, and uniformly maintain greater or longer steam port opening during a predetermined period of the engine piston forward and backward strokes than is obtainable with a conventional valve gear, and without increasing the total time of the periods of the valve movement.

Further objects of the invention are to provide:

1. An auxiliary mechanism for the purpose above stated which will function without altering the construction or mode of operation of the conventional valve mechanism.

2. An auxiliary mechanism for the purpose stated whereby greater steam port openings may be maintained without reducing the effectiveness of the admission, expansion, compression, and release periods.

3. An auxiliary mechanism whereby when the drive wheel crank is at the least favorable angle of leverage, or any comparative angle, following the beginning of the driving piston stroke, a large steam port opening will be maintained so as to produce the greatest pressure effect when most desired or required.

4. An auxiliary mechanism whereby the combining lever may be so proportioned, or its pivotal connection with the valve stem varied, and connected with the radius rod and crosshead arm that maximum steam port opening at all cut-offs is obtainable without resulting in excessive pre-admission.

5. An auxiliary mechanism whereby the steam port opening or lead can be made from two to four times greater in steam port area than would otherwise be possible without altering the preadmission point.

6. An auxiliary mechanism whereby the foregoing enumerated objects may be accomplished and the admission and exhaust ports opened and closed at the same relative points in the forward and backward strokes of the driving piston.

7. An auxiliary mechanism whereby the steam port openings at maximum cut-offs, could if desired, be smaller in proportion to the steam port openings at short cut-offs, thereby making it possible to operate the engine on longer cut-offs at a higher rate of speed without excessive compression, and thereby developing more power faster without the necessity of shortening the cut-off to reduce compression.

8. An auxiliary mechanism whereby the valve travel at minimum cut-off is not much greater, determined by the length of lead, than with the conventional valve gear operating valves having the same steam lap, and at the same time providing a large increase in steam port opening without affecting the prescribed pre-admission point.

9. An auxiliary mechanism whereby it is possible to operate engine valves at much lower cut-off percentage while operating at the shortest or minimum travel, i. e., with the radius rod coupling to the main link in the position to operate midway between full forward and full reverse movement. Conventional valve gear for locomotives are limited in practice to a cut-off of about twenty-one percent, whereas with the addition of this auxiliary mechanism it is possible under minimum travel to operate at approximately four percent cut-off with a steam port opening four times greater than the opening with the conventional gear operating at twenty-one percent cut-off.

10. An auxiliary mechanism for the purpose above stated whereby steam port openings can be made identical for all cut-offs so that greater initial boiler pressure can be utilized with greater throttle openings, resulting in higher obtainable piston pressures when the main driving cranks are at the least favorable angle to transmit power to the wheels, with a gradual decreasing of steam port opening as the main crank angle increases or moves away from the dead-center, thereby automatically reducing wheel slippage and at the same time creating higher pressure against the piston, but with that pressure constantly increasing and decreasing in synchronism with the main crank angles.

And finally the object is to provide a valve gear in which all timing and controlling elements and means for altering or adjusting the timing of the valve periods are entirely external to the valve chamber.

In carrying the invention into effect I provide in the preferred form an auxiliary lever and link connection between the crosshead arm and the combining lever of a conventional valve gear instead of connecting the crosshead arm directly to the combining lever. This auxiliary lever and link system comprises, (1) a pendulous lever pivoted to a block or bracket fixed on the upper crosshead slide or upon some other stationary part of the engine frame, preferably above the path of movement of the crosshead, and either near the forward or backward limit of its movement. This lever is pivotally coupled directly to the valve gear arm journalled on the crosshead and has a short arm preferably projecting at an obtuse angle beyond the pivotal point of connection to the crosshead arm. And (2) a pair of toggle-links, consisting of a link in the form of a bell-crank lever having a short arm which is hinged to the end of the crosshead arm, i. e., beyond the pivotal connection of the pendulous lever to the crosshead arm, and a plain link, one end of which is hinged to and forms the fulcrum point of the bell-crank lever, and the other end of the plain link is hinged to the end of the short arm of the pendulous lever. The other or longer arm of the bell-crank lever is hinged to a union link which is hinged to the end of the combining lever.

The purpose of this auxiliary lever and link system is to modify the movements of the combining lever usually imparted by the reciprocations of the radius rod and drive-rod crosshead to effect (1) at the inlet port an accelerated movement of the valve in opening the inlet port to the driving cylinder for pre-admission; (2) a decelerating movement of the valve after steam admission to provide maximum steam pressure as the driving crank passes the dead-center; (3) a slower movement of the valve after full opening to maintain a large steam port opening as the driving crank moves away from its dead-center; (4) an accelerated movement of the valve after the driving crank has moved through a given angle to obtain rapid cut-off and avoid the so-called wire-drawing effect; (5) a gradually slowing down movement of the valve after the cut-off to the midway position and then a gradually accelerating movement to the point of release to provide maximum expansion; (6) rapid opening of the exhaust port after each expansion period during the forward and backward piston strokes to avoid excessive compression; and (7) to effect the modified movements without modifying the total length of the usual admission, expansion, exhaust and compression periods.

The invention is illustrated in the accompanying drawings in which—

Figure 1 is a schematic illustration of a driving and valve gear of a locomotive engine showing the auxiliary valve gear mechanism coupled between the driving piston crosshead and the combining lever of a conventional valve gear.

Figure 2 is an enlarged detail view showing the relative positions of the driving piston and crosshead, the auxiliary lever and link system, and the combining lever and valve at the end of the forward stroke and beginning of the backward stroke of the driving piston, after pre-admission, and showing the full opening of the admission and exhaust ports.

Figure 3 is a view similar to Figure 2 showing the central or midway position of the driving piston and crosshead, the valve and auxiliary actuating mechanism during the expansion period.

Figure 4 is a view similar to Figures 2 and 3 showing the position of the parts at the end of the return or backward stroke, after pre-admission, and beginning of the forward stroke of the driving piston.

Figure 5 is a vertical section and end view taken on the line 5—5 of Figure 3 looking in the direction of the arrows.

Figure 6 is a schematic illustration showing the relative positions of the combining lever and valve preceding the cut-off.

Figure 7 is a diagrammatic illustration showing the angular position of the main driving crank under conditions employing the conventional valve gear where maximum steam port opening occurs at maximum cut-off, and the relative angular position of the crank when the auxiliary lever and link connection of the present invention is employed to provide a maximum steam port opening at the point of most effective piston stroke.

Figure 8 is a graphic illustration of the forward and backward valve strokes when actuated by a conventional valve gear having the auxiliary lever and link system coupled therein, and illustrating the maximum steam port opening of one and one-half inches with a maximum valve travel of seven and one-quarter inches, and a lead of one and one-quarter inches with cut-off occurring at a travel of the driving piston of two and three-quarter inches after the beginning of the stroke in either direction.

Figure 9 is a view similar to Figure 8 illustrating the forward and backward strokes of the valve when actuated by a conventional gear operating without the intervention of the auxiliary lever and link system.

Figures 10, 11 and 12 are schematic views illustrating modified arrangements of the auxiliary lever and link system adapted for use with a valve gear suited to particular conditions and requirements of locomotive design, and Figures 13 and 14 are schematic views illustrating modified arrangements of the auxiliary lever and link system adapted for use with a conventional valve gear where the space between the cylinder and crosshead is limited.

Referring to the drawings, and more particularly to Figure 1, A represents one of the usual driving cylinders of a locomotive engine; B the driving piston; B' the piston rod; C the reciprocating crosshead; D the connecting rod; E the main driving crank pin; F the cylindrical valve chamber mounted on the driving cylinder; G the cylindrical slide-valve spool; H the valve gear reversing or rocker link; J the radius rod coupled between rocker link H and the upper end of the valve actuating combining lever L; M the usual power device, link and lever for adjusting the radius rod on the reversing link H; N the eccentric crank arm fixed on the drive pin E and coupled by rod O and arm P to rocker link H for oscillating the link in unison with the reciprocations of the driving piston; and R the rocker-arm journalled on crosshead C at C' for transmitting the reciprocations of the crosshead to the combining lever L through the usual union link S. The parts thus enumerated constitute the mechanism and operating connections of a conventional type of locomotive driving and valve gear.

In such gear when the crosshead rocker-arm R is coupled directly by the usual union link to the lower end of the combining lever L the combined movement imparted from the crosshead and driving crank-pin to the combining lever effects a valve movement relative to the movement of the driving piston as illustrated graphically in Figure 9. In that figure it will be noted that with a valve lead of five sixteenths inch and a front lap of one and five-eighths inch a maximum steam port opening of two inches is obtained, and cut-off in minimum gear occurring at two and three-quarter inches from the beginning of the piston stroke with a valve travel of seven and one-quarter inches. Also it will be noted that in full gear the maximum steam port opening will occur when the driving piston has travelled approximately eleven inches, and that under such conditions the driving crank will have advanced through an angle of approximately seventy-five degrees from the dead-center position as illustrated in Figure 7.

Referring now to the auxiliary lever and link system which is the basis of the present invention, Figure 1 shows the position of the driving piston, valve and valve mechanism after the start of the backward stroke of the driving piston with the exhaust port wide open and the admission port still open and showing the driving crank advanced approximately sixty degrees past the forward dead-center angle.

In Figures 2, 3 and 4, B indicates the driving piston; C the reciprocating crosshead; F the valve chamber; G the valve spool; J the radius rod; L the combining lever; R the crosshead rocker-arm; and S the union link coupling the auxiliary lever and link system to the combining lever.

The driving piston in these views is shown in the extreme forward, the midway, and the extreme rearward positions, respectively, and showing the relative positions of the valve and the auxiliary lever and link system. It will be observed that when the valve and driving piston are in the midway positions as seen in Figure 3, the combining lever is in its central position. As indicated in Figure 6 it will also be observed that the combining lever swings forward and backward to the same degree from its central position, and that the intervening positions between the two extremes on either side of the center effecting the successive valve periods occur at the same relative points in the forward and backward strokes so that the admission, expansion, release and compression periods for the forward and backward strokes of the driving piston will be of equal duration, respectively, in both directions, and will occur at the same relative points on either side of the midway position of the combining lever.

The crosshead C slides between bars 1 and 2, and on the bar 1 is mounted a fixed pivot block 3 on which pendulous lever 4 is pivoted at 5. This pivot point is so located that the lever 4 will swing through an equal arc either side of its central vertical position during the full length travel of the crosshead C. Lever 4 is hinged directly to rocker-arm R at a point 6 between the journal of said arm and its outer end, and beyond pivot 6 the lever 4 has a short arm 7 projecting downward at an obtuse angle. Thus as lever 4 swings through a long arc from one extreme position, Figure 2, to the opposite extreme, Figure 4, the rocker-arm due to its hinged connection at 6 with lever 4 is caused to rock in a vertical plane through a short arc from the extreme upward position shown in Figures 2 and 4 to the extreme lowermost position shown in Figure 3, which latter position is the midway position of the auxiliary lever and link system, combining lever and valve. Hinged at the end of the rocker-arm R at 8 is a bell-crank lever having a short arm 9 and long arm 10, the fulcrum point 11 of which is hinged to the end of a plain link 12, the other end of which link being hinged at 13 to the end of the short arm 7 of the pendulous lever 4. The long arm 10 of the bell-crank lever projects approximately at a right angle to the short arm 9, and at the end of arm 10 is a pivot pin 14 to which the union link S is hinged. Thus arms 9 and 10 of the bell-crank and link 12 form a toggle-lever connection between the crosshead arm R and union link S actuated by the combined movements of lever 4 and arm R.

Referring to Figure 5 it will be noted that the lever 4 is bifurcated forming two arms 7 between which the crosshead arm R and link 12 are respectively hinged at pivots 6 and 13; and that the arms 9 and 10 of the bell-crank lever are also bifurcated, or formed in pairs, between which the end of arm R and link 12 and union link S are respectively hinged at pivots 8, 11 and 14. This construction provides both a two-point bearing at each of the pivotal points 6, 8, 11, 13 and 14 and clearance for the lever and link members in moving from one extreme position to the other as indicated in Figures 2, 3 and 4.

It will be observed that during the swing of the pendulous lever 4 in unison with the movement of the crosshead C from one extreme to the other, that is, backward from the position of Figure 2 to the position of Figure 4 for the complete backward stroke of the driving piston and valve, and the vertical movement of rocker-arm R from its uppermost position of Figure 2 to its lowermost position of Figure 3 and back again to the position of Figure 4, the arm 10 of the bell-crank lever is caused to swing upward and forward in the vertical plane on hinge 8, and that during the forward movement of the crosshead from the position of Figure 4 to the position of Figure 2, the reverse movements of the toggle-lever connection take place. This swinging movement of the auxiliary lever and link system is due entirely and directly to the movement of crosshead C.

By reference to Figure 6, it will be noted that in the position of the valve spool G, indicated by the broken line position 15ª, which is the limit of the forward stroke, the valve-head 15 provides a maximum steam port opening of one and one-half inches at the port 16, or one and one-quarter inches when operating at minimum lead, and that the valve-head 17 is positioned an equal distance from the edge of the port 18, so that at the point where valve-head 15 effects complete cut-off of steam admission to port 16 the port 18 is still fully open for exhaust and that its closure proceeds during the expansion period. By reference to Figures 2, 3 and 4 it will be noted that in the movement of the valve spool from the position of Figure 2 to the position of Figure 4, the valve-heads 15 and 17 close and open ports 16 and 18 in exactly the same ratio so that when head 15 cuts off admission at port 16 head 17 begins to cut down exhaust at port 18, and that the exhaust continues until the valve spool arrives at the midway position where both ports 16 and 18 are closed as shown in Figure 3 for the start of the compression period. Before the end of the backward stroke, that is, before the valve arrives at the position of Figure 4, the valve-head 17 opens port 16 for pre-admission to the rearside of driving piston B and port 16 will be fully open for the exhaust period.

The movement of the driving piston to the end of its stroke, i. e., the dead-center position of the driving crank, carries the valve to the end of its stroke to effect the widest opening of the admission port and full opening of the exhaust port as seen in Figures 2 and 6. It will be observed that as the driving piston starts moving backward, that is, to the left as viewed in Figure 2, the crosshead in drawing the rocker-arm R backward exerts a direct momentary straight line pull on the entire auxiliary lever and link system, i. e., lever 4—7, toggle-lever linkage 9, 10 and 12, imparting a pull on union link S and combining lever L, thereby imparting a rearward movement to the valve. Simultaneously with this direct pull the combined action of arms R and 7 actuate the toggle linkage causing arm 10 to swing upward. Thus the movement of the combining lever from either extreme position through the auxiliary lever and link system is retarded due to the upward swing of bell-crank arm 10 so that the movement of the valve from its extreme position at the beginning of each stroke toward the cut-off point is relatively slow, thereby maintaining the admission port wide open to a greater degree than would be the case if the combining lever were actuated directly from the crosshead. When the valve-head at the admission port has travelled a certain distance, approximately one-fifth its length of travel toward the cut-off position, the rate of movement increases up to the cut-off and then gradually decreases to the mid-travel position. This action is due to the movements of the auxiliary lever and link system in transmitting the travel of the driving piston to the combining lever and valve. Thus it will be observed that as the rocker-arm R moves longitudinally in unison with the driving piston, for instance, from the position shown in Figure 2 toward the position shown in Figure 3, the rocker-arm, due to its pivotal connection with the pendulous lever 4, is caused to swing downward. This causes the pivot points 8, 11 and 13 to move downward proportionately to the swing of arm R and lever 4, and since pivot point 13 moves in a slightly longer arc than pivot point 8, the pull on link 12 will cause the long arm 10 of the bell-crank lever to swing upward on the pivot point 8 while at the same time the bell-crank is drawn along with the arm R. Thus as the movement of the auxiliary lever and link system acts on the union link S to pull the combining lever L in the same direction the upward swing of arm 10 tends to effect a movement of link S in the opposite direction, and therefore modifying or retarding the pull on link S and causing the relatively slow movement to be imparted to the combining lever and valve stem at the start of the stroke. According to the proportions of the parts as illustrated in the drawings, and assuming that the length of piston stroke is thirty inches and its movement from the start of its stroke to the cut-off point two and three-quarter inches, as indicated in Figure 8, then as the driving piston moves one inch from the stroke starting position of Figure 2 (at which instant the driving crank is in the dead-center position) the valve will move approximately one-quarter of an inch relative to the travel of the driving piston, that is, at a ratio of 1.0 to 0.25 (assuming the radius rod is set at the neutral position Figure 6) and maintaining a valve lead of one inch, and with the further movement of the driving piston of one and three-quarter inches to the cut-off point the valve will travel one inch, or, at a ratio of 1.75 to 1.0. Thus the first fifth of the valve movement toward the cut-off point occurs at a much slower rate relative to the piston movement than the last four-fifths to the cut-off point. It will be noted in this connection as illustrated in Figure 7 of the drawings, that in the movement of the driving piston the first inch from the starting point the driving crank E will move from the dead-center position through an arc of approximately twenty degrees, or to a point where the most effective power drive may be imparted thereto by the piston while the valve opening is still one inch, and that when the driving piston has moved to the cut-off point of the admission period the driving crank will have moved through an arc of approximately twenty-five degrees where the expansion period begins. This permits operation of the driving piston during the expansion period travelling twenty-four and one-half inches with unrestricted exhaust at the exhaust port.

As the crosshead C continues its backward movement after the cut-off, the pendulous lever 4 continues its swing to the left and pivot point 6 moving in its long arc causes rocker-arm R to swing downward at a slower rate while arm 7 swings laterally at a greater rate toward the position of Figure 3, and thus the downward movement of pivot point 8 in this part of the movement causes arm 10 of the bell-crank lever to swing upward on its pivot point 8 at a faster rate which further retards the pull on union link S and combining lever L and reduces the rate of movement of the valve. This slowing down movement of the valve spool continues until it reaches the central position shown in Figure 3, at which point the valve is almost at a standstill. As the arm 10 passes over its central vertical position it gradually reduces the retarding effect on union link S, and causes a gradually increased pull on the combining lever. Thus according to the assumed thirty inch piston stroke, the piston in moving to the central position will have travelled fifteen inches, or twelve and one-quarter inches from the cut-off point, and the valve will have travelled two and one-eighth inches beyond the cut-off point, approximately at a ratio of 5.75 to 1.0, compared to the piston travel of two and three-quarter inches and valve travel of one and one-quarter inches to the cut-off point, approximately at a ratio of 2.2 to 1.0.

As the crosshead continues its backward movement from the position of Figure 3, the pendulous lever 4 begins to swing upward and draws the rocker-arm R upward at a gradually increasing rate toward the position of Figure 4. In this part of the movement the toggle action of bell-crank arm 9 and link 12 causes arm 10 to swing forward and continues the retarded pull on union link S, but at a gradually reduced rate as arm 10 moves more into alignment with arm R as seen in Figure 4. As the auxiliary lever and link system is drawn along by the crosshead the combining lever is now drawn rearward practically by direct pull, causing the valve heads 15 and 17 to open ports 16 and 18 for release and pre-admission, respectively, and cushioning of the piston stroke. This movement of the valve will be at a gradually increasing rate, as will be apparent, due to the increasing forward tilt of arm 10, causing gradual decrease in the retarding effect and eventual direct pull on the union link S to effect the full opening of both ports 16 and 18 as shown in Figure 4 with a relatively rapid movement.

The piston and valve now being in position for the start of the forward stroke, the crosshead begins to move forward, and as will be apparent by reference to Figure 4, the forward swing of the pendulous lever 4 will cause crosshead arm R to swing downward and the combined effect of the movements of arm R, arm 7 of lever 4, and link 12, will cause arm 10 of the bell-crank lever to swing upward and backward on its hinge 8, thus reducing the distance between pivotal point 8 and the hinge point 19 of link S with the combining lever, and tending to pull union link S and lever L backward while the crosshead and auxiliary gear as a whole are moving forward. This simultaneous forward and backward action causes the slow starting movement of the valve, and as the piston and crosshead move forward one inch, the valve will move forward one-quarter inch, the same as in the initial backward movement as above explained in describing the backward movement of the piston and valve from the position of Figure 2, and thus maintaining the admission port opening of one inch at port 18 while the driving crank has moved twenty degrees from the dead-center position. After the driving piston movement of one inch from the position of Figure 4, and the driving crank E arrives at a point opposite to that illustrated by Figure 7, the valve will move at an increased rate toward the cut-off point as above described in connection with Figure 2 due to the decreasing rate of downward movement of arm R and pivot point 8 of bell-crank arm 10, thus reducing the retarding effect at pivot point 14 and effecting a more positive forward push to union link S.

It will be noted that as the crosshead moves forward from the position of Figure 4, the lever 4 in swinging towards its central or perpendicular position causes arm R and link 12 to effect a more rapid movement of the arm 10, and hence as the rate at which arm 10 swings upward and backward increases, the relative rate of forward movement of the combining lever will be slow at the start to maintain the large admission port opening at 18 with the same effect as above described in connection with Figure 2, and that after the cut-off the movement continues to decrease until lever 4 arrives at the central position of Figure 3, whereupon the combined upward swing of arm R and lever arm 7 in moving the toggle linkage upward, reduces the effect of the backward pull of arm 10 on union link S, and cause the combining lever to move gradually forward at a relatively faster rate. Thus the forward movement of the combining lever L from the position shown in Figure 4 will be retarded at first in the same manner and to the same degree as in the beginning of the backward stroke from the position shown in Figure 2 as above described to maintain a large admission port opening and then effect a rapid cut-off at the port 18.

From the foregoing description of the movements of the valve effected by the use of the auxiliary lever and link system connected between the crosshead and combining lever it will be seen that a greater steam port opening is maintained at the start of the driving piston stroke, and that such opening coincides with the arrival of the driving crank at an advanced or preferred angle for most effective power application to the driving wheels. It will also be seen that this object is accomplished without altering the predetermined total duration of the valve periods and without reducing the effectiveness of such periods.

It will also be seen that by employing a combining lever having its pivotal connection with the valve stem slide at approximately a central point, the combining lever may have a variable pivotal connection with the valve stem to vary the application of the reciprocations of the radius rod and crosshead to the valve when operating at maximum or minimum gear to obtain maximum steamport opening at longer cut-offs without alteration of the arrangement or operation of the gear mechanism and without resulting in excessive pre-admission, and that the lead can be made at least four times greater than with the conventional gear without altering the pre-admission point. Also that the valve periods due to the central connection of the combining lever with the valve stem and consequent adaptability for adjustment of the combining lever on the valve stem without alteration of the gear connections with the main drive pin and crosshead due to the compensating automatic adjustability of the toggle-lever linkage may always be maintained uniform during the forward and backward strokes of the driving piston and at the same relative points on either side of the midway position of the piston and valve. And finally that these objects and adjustments may be obtained by simple adjustment of the combining lever connection with the valve stem.

It will be observed by comparison of Figures 2, 3 and 4, that the pivot for the pendulous lever 4 is set forward of the midway point of the length of travel of crosshead C as indicated by the crosshead center C' relative to the vertical center of pendulous lever pivot 5 in Figures 2 and 4 in which figures the crosshead is shown at the limit of its forward and backward movements respectively. It will also be observed that the lever 4 in its full swing moves an equal distance either side of its vertical center 5 and thus by suitably proportioning the length of arm 7, toggle link elements 9, 10 and 12, and the spacing of pivot centers 8, 11, 13 and 14, the combining lever L as indicated in Figure 6 will uniformly swing an equal distance to either side of its vertical center, and that therefore the valve periods will be uniform on the forward and backward strokes and occur at the same points in both strokes of the valve relative to the driving piston. And thus it will be obvious that any change desired in the length of the valve movement to alter the lead and periods may be readily accomplished by varying the pivotal point of the combining lever on the valve stem slide to alter the relative lengths of the upper and lower arms thereof, and altering the relative length of the union link S, both of which adjustments can be accomplished by predetermined design or by providing a plurality of pivot holes on lever L and union link S.

The modified forms of auxiliary lever and link systems shown in Figures 10 to 14 inclusive are intended to adapt the system to various locomotive constructions. In Figure 10, the toggle links and the connections to the crosshead arm and pendulous lever are changed. In this form the angle of the arms of the bell-crank lever is reduced, its position reversed, and is pivoted to the crosshead arm R at its fulcrum point 11 instead of at the end of arm 9 as in Figure 2. The bell-crank and pendulous lever 4 have a common pivotal point 6 at the end of crosshead R, and link 12 is coupled between arm 9 of the bell-crank and arm 7 of the pendulous lever 4.

The action is similar to that of the form shown in Figure 2, but the modified form is adapted for locomotives of short length between the drive wheels and driving piston cylinder.

In Figure 11 the arrangement and purpose is similar to the arrangement illustrated in Figure 10 except that the cross-head arm R has a right angle bend 20 and the bell-crank lever is pivoted at 21 on the end of arm 20. In Figure 12 the pendulous lever 4 has its extension 7 projecting in the opposite direction and arm R has its pivotal connection 6 with lever 4 at its end instead of at an intermediate point. Also instead of a bell-crank, a link 22 is hinged to union link S at 23 and at 13 to the end of extension 7. To this link is hinged at a point 24 between the pivots 23 and 13 a supplementary crosshead arm or link 25, shorter than arm R, so that as lever 4 swings in its arc to shift arm R in the vertical plane, link 25 will cause link 22 to swing on its hinge 23 to produce the same effect on the union link S as the bell-crank of the other forms.

In Figure 13 a centrally pivoted crosshead lever having arms 26 and 27, preferably of equal length, and a straight pendulous lever 4 are employed. The forwardly projecting arm 26 is hinged at 6 to lever 4 and the rearwardly projecting arm 27 has hinged to it at 28 a centrally pivoted lever, the arms 29 and 30 of which are of equal length and of the same length as extension 7 of lever 4. Extension 7 and lever arm 29 are coupled together by a link 31 of a length to hold levers 4—7 and 29—30 parallel. Lever arm 30 is hinged to union link S. By this means as crosshead C reciprocates, levers 4—7 and 29—30 will swing in parallel from pivot 5 of lever 4 as indicated in broken lines and produce an effect on union link S and combining lever L similar to the bell-crank connection. This arrangement as illustrated in Figure 13 is suitable for an engine construction where the distance between the crosshead and driving cylinder is short which necessitates bringing the pendulous and combining levers into close proximity.

In Figure 14, the arrangement is of the same type as in Figure 13, but the relative positions of the levers 4—7, arms 26—27 and 29—30 are reversed and the pendulous lever is placed to the rear of the crosshead center C' instead of in front as in Figure 13. In this form the pendulous lever 4 is longer in proportion to the short arm 7 necessitating a higher pivot block 3, and arm 7 is shorter than lever arm 29. Also by shifting the position of lever 4 a much shorter union link S is employed. In this arrangement levers 4—7 and 29—30 coupled together by link 31 do not swing in parallel as in the arrangement of Figure 13 due to the difference in length of lever arms 7 and 29, and the effect is to vary the tilt of lever 29—30 relative to lever 4—7 as indicated in broken lines, but the effect on union link S and the combining lever L is similar to the action produced by the use of the bell-crank lever connection.

What I claim is:

1. In an engine valve mechanism, the combination with a slide-valve and its actuating lever, of an arm journalled on the engine driving crosshead, a pendulous lever pivoted at a fixed point, said crosshead arm and pendulous lever being hinged together at a point intermediate their length, and a lever and link system coupled between the ends of said crosshead arm and pendulous lever and said valve actuating lever, whereby the movement of the valve actuating lever is modified throughout the engine strokes.

2. In an engine valve mechanism, the combination with a slide-valve and its actuating lever, of an arm journalled on the engine driving crosshead, a pendulous lever pivoted at a fixed point and hinged to said crosshead arm, a pair of links, one hinged to said arm and one to said pendulous lever, and said links being hinged together, and one of said links being coupled to said actuating lever, whereby a retarded movement is imparted to the valve at the beginning of each valve stroke, an accelerated cut-off movement, and a decelerating movement after the cut-off.

3. In an engine valve mechanism, the combination with a slide-valve and its actuating lever, of a link coupling said lever to the main driving crank, an arm journalled on the driving piston crosshead, and a retarding and amplifying lever and link system coupled between said valve actuating lever and crosshead arm, whereby the reciprocations of the crosshead are imparted to the valve lever in varying degree at both ends of the engine stroke to provide an accelerated movement in effecting the pre-admission period, a retarded movement as the driving crank passes over the dead-center position, an accelerated movement in effecting the cut-off, and a gradual decelerating and accelerating movement during the expansion period.

4. In an engine valve mechanism, the combination with a slide-valve and a link mechanism actuated from the main driving crank, of a combining lever actuated by said link mechanism, an arm journalled on the driving piston crosshead, a pendulous lever pivoted at a fixed point and hinged to said crosshead arm, and a counteracting lever and link system coupled between said arm and pendulous lever and said valve actuating lever, whereby when the link mechanism is set for maximum valve travel and cut-off the reciprocations of the crosshead are imparted to the combining lever at the start of a stroke in either direction with a retarded action to effect a slow movement for maintaining a large steam-port opening and an accelerated movement to effect rapid cut-off after the driving crank has rotated from its dead-center position through an arc of approximately twenty degrees.

5. In an engine valve mechanism, the combination with a slide-valve and its actuating lever, of an arm journalled on the engine driving crosshead, a pendulous lever pivoted at a fixed point and hinged to said crosshead arm, and a toggle-lever linkage coupled between said pendulous lever, crosshead arm, and actuating lever, whereby the reciprocations of the crosshead are transmitted to the valve to effect a varying rate of valve movement throughout its stroke.

6. In a locomotive engine valve mechanism, the combination with a slide-valve and a link mechanism actuated from the main driving crank, of an arm journalled on the engine driving crosshead, a combining lever actuated from the driving crank through said link mechanism and from the driving crosshead, a pendulous lever pivoted independently of the valve link mechanism and coupled to the crosshead arm, and a toggle-lever linkage coupled between said pendulous lever, crosshead arm, and combining lever, whereby the uniform reciprocations transmitted from the driving crank and crosshead are converted into valve reciprocations of varying degree throughout its stroke.

7. In a locomotive engine valve mechanism, the combination with a slide-valve and its actuating lever, of an arm journalled on the engine driving crosshead, a pendulous lever pivoted at a fixed point and hinged to the crosshead arm, an oscillating lever pivoted on the crosshead arm and coupled to said actuating lever, and a link coupling said pendulous and oscillating levers, whereby the reciprocations of the crosshead are transmitted to the valve with predetermined variations throughout the length of the valve stroke.

8. In a locomotive engine valve mechanism, the combination with a slide-valve and its actuating lever, of an arm journalled on the engine driving crosshead, a pendulous lever pivoted at a fixed point and hinged to the crosshead arm, a bell-crank lever having an arm hinged to the crosshead arm and an arm coupled to said actuating lever, and a link coupled between the end of the pendulous lever and the bell-crank, whereby the reciprocations of the crosshead are transmitted to the valve with predetermined variations throughout the length of the valve stroke.

9. In an engine valve mechanism, the combination with a slide-valve and its actuating lever, of an arm journalled on the engine driving crosshead, and means coupled between said lever and crosshead for transmitting the reciprocations of the crosshead to the valve, said means comprising a pendulous lever pivoted above the path of travel of the crosshead and hinged intermediate its length to an intermediate point on the crosshead arm, a bell-crank lever hinged to the end of the crosshead arm and to a link coupled to the valve actuating lever, and a link hinged between the end of the pendulous lever and the fulcrum point of the bell-crank lever.

10. In an engine valve mechanism, the combination with a slide-valve and its actuating lever, of an arm journalled on the engine driving crosshead, and means coupled between said lever and crosshead for transmitting the reciprocations of the crosshead to the valve, said means comprising a bent pendulous lever pivoted above the path of travel of the crosshead and hinged at its bend to an intermediate point on the crosshead arm, a bell-crank lever hinged to the end of the crosshead arm and to a link coupled to the valve actuating lever, and a link hinged between the bent end of the pendulous lever and the fulcrum point of the bell-crank lever.

11. In an engine valve mechanism, the combination with a slide-valve and its actuating lever, of an arm journalled on the engine driving crosshead, and means coupled between said lever and crosshead for transmitting the reciprocations of the crosshead to the valve, said means comprising a bent pendulous lever pivoted to swing fore-and-aft in a vertical plane, an arm journalled on the crosshead to swing in a vertical plane, said pendulous lever and arm being hinged together at a point intermediate their length, a bell-crank lever having a short arm hinged to the end of the crosshead arm and a longer arm hinged to a link coupled to said actuating lever, and a link hinged between the bent end of the pendulous lever and the fulcrum point of the bell-crank lever.

CLYDE F. BERRY.

REFERENCES CITED

The following references are of record in the file of this patent:

UNITED STATES PATENTS

| Number | Name | Date |
|---|---|---|
| 2,255,902 | Sherrill | Sept. 16, 1941 |
| 2,338,589 | Knowles | Jan. 4, 1944 |
| 2,344,847 | Berry | Mar. 21, 1944 |